May 28, 1963 R. S. SHELDON 3,091,309
FLUID DYNAMOMETER

Filed May 8, 1961 3 Sheets-Sheet 1

INVENTOR.
ROBERT S. SHELDON
BY
Ervin B. Steinberg
AGENT.

May 28, 1963   R. S. SHELDON   3,091,309
FLUID DYNAMOMETER
Filed May 8, 1961   3 Sheets-Sheet 2

*INVENTOR.*
ROBERT S. SHELDON
BY
Ervin B. Steinberg
AGENT.

May 28, 1963 R. S. SHELDON 3,091,309
FLUID DYNAMOMETER

Filed May 8, 1961 3 Sheets-Sheet 3

*INVENTOR.*
ROBERT S. SHELDON
BY
Ervin B. Steinberg
AGENT.

3,091,309
FLUID DYNAMOMETER
Robert S. Sheldon, West Hartford, Conn., assignor to Kahn & Company, Inc., Wethersfield, Conn., a corporation of Connecticut
Filed May 8, 1961, Ser. No. 118,481
7 Claims. (Cl. 188—90)

This invention relates to an energy absorbing device and more particularly refers to a fluid dynamometer.

The art of dynamometers is a well known and established one. In general, each such device comprises a stator and a rotor with restricted fluid passages between the stator and the rotor. The rotor is driven by a rotating device under test and upon introducing fluid, partially liquid such as water, into the passages between the stator and rotor, the liquid absorbs energy and hence, the rotor presents a torque to the device under test. The braking power of the dynamometer is influenced among other factors by the size of the unit, its internal construction, and the amount of liquid passing between the stator and the rotor. Depending upon the power to be absorbed by the dynamometer, its size many differ over a wide range.

Certain devices described in the prior art are afflicted with vibratory conditions and high frequency beats which manifest themselves at various speeds. Other units are not readily usable over an extended load range. Some of these limitations and disadvantages have been overcome by providing a new and improved dynamometer design which is characterized by several distinct and novel features as will be disclosed in the following description.

One of the main objects of this invention therefore, is the provision of a fluid dynamometer design which overcomes one or more of the limitations and disadvantages of prior art devices.

Another object of this invention is the provision of a dynamometer which readily can be adjusted for a wide range of power absorption by adding or removing certain internal features.

Another object of this invention is the provision of a fluid dynamometer which by virtue of its construction substantially eliminates the possibility of high frequency beats and avoids undesirable vibratory conditions caused by features usually inherent in dynamometer designs of the prior art.

A further object of this invention is the provision of a dynamometer which is characterized by extreme simplicity and reliability.

A further and still other object of this invention is the provision of a dynamometer which has a novel arrangement for introducing liquid into the space between the stator and rotor, and also for exhausting liquid from this space.

Further and still other objects of this invention will be apparent by reference to the following description when taken in conjunction with the accompanying drawings in which.

Figure 1:
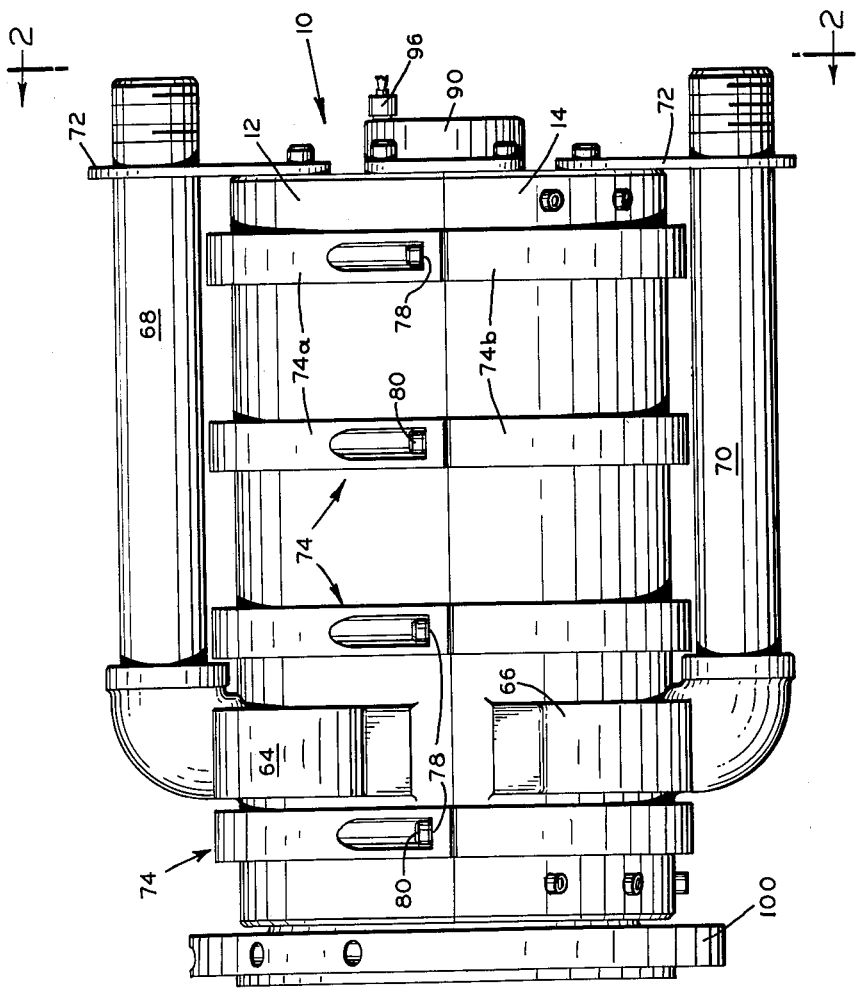
FIGURE 1 is a side elevational view of the dynamometer according to the present invention.
Figure 4:
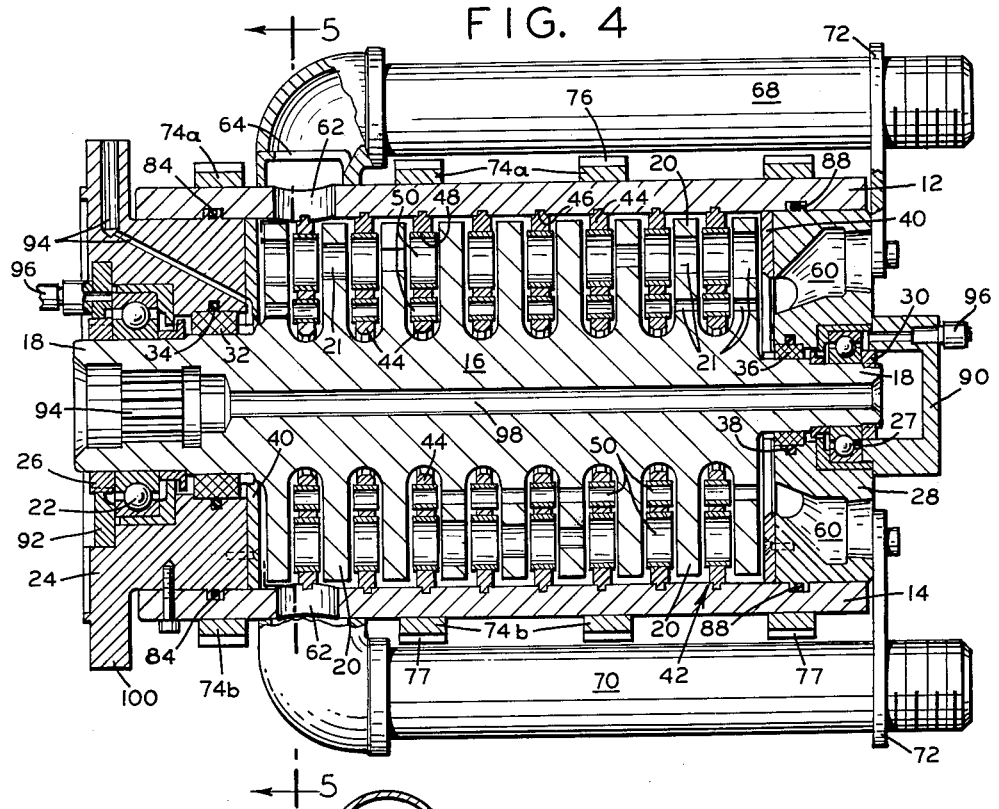
FIGURE 4 is a sectional view through the stator and rotor assembly along lines 4—4 in FIGURE 2.
Figure 5:
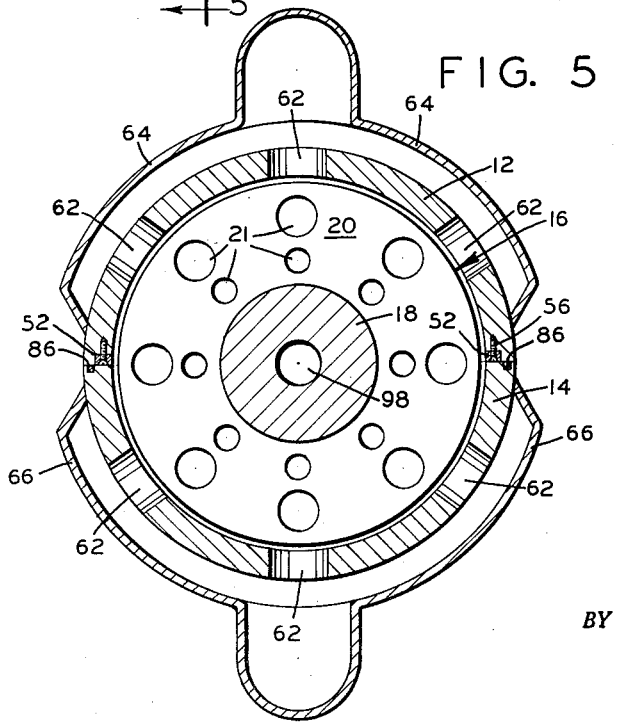
FIGURE 5 is a sectional view along lines 5—5 in FIGURE 4.

Referring now to the drawings which depict the dynamometer, a stator housing, generally indicated by reference numeral 10, FIGURE 1, is axially split into two halves 12 and 14 which are assembled around the preassembled internal components. A rotor 16, FIGURES 4 and 5, is made integral with the shaft and includes the central shaft portion 18, and a plurality of extending, axially spaced disks 20, each having a plurality of axial apertures or holes 21 therein arranged in a manner to be offset relative to corresponding apertures in the adjacent stator plates. The shaft portion 18 of the rotor protrudes at either end axially and is journalled at one end in a ball bearing 22 which is secured in an endcap 24 by a locknut 26, and in a ball bearing 27 in an opposite endcap 28 and secured by a locknut 30. A water seal 32 together with an O-ring gasket 34 in the endcap 24 prevents leakage of water and the consequent deterioration of the bearing 22. A similar water seal 36 and O-ring gasket 38 are employed in the endcap 28. A wear plate 40 is inserted between each of the end caps 24 and 28 and rotor 16.

Figure 3:
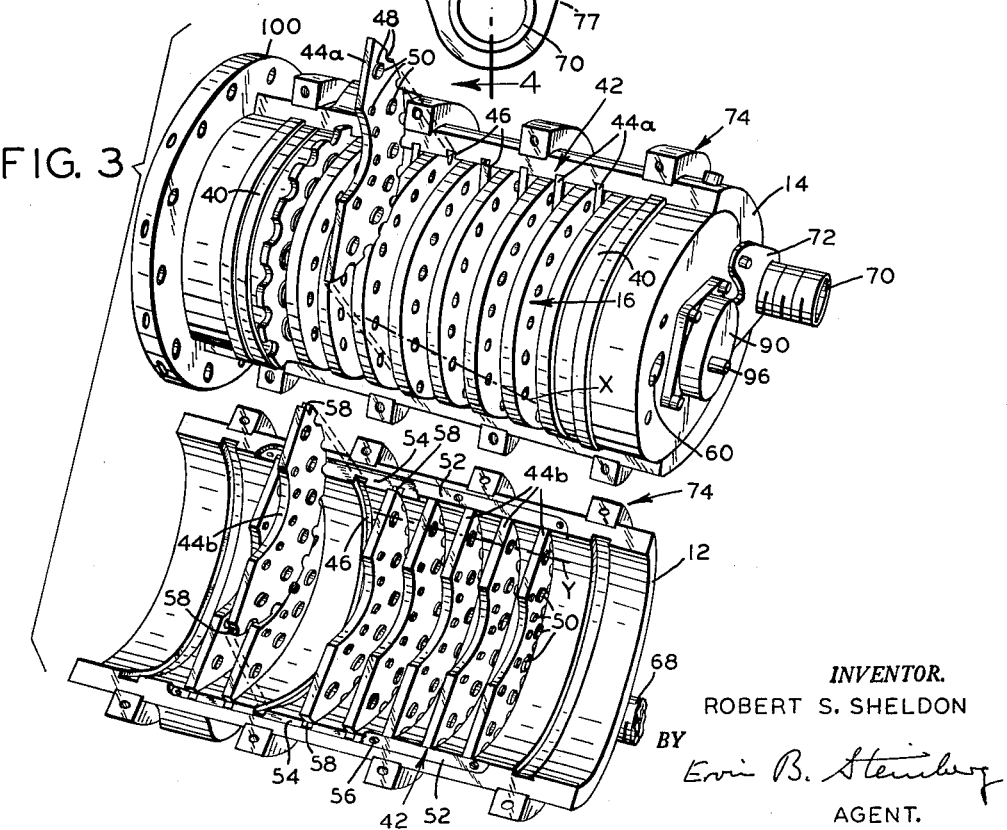
FIGURE 3 is a perspective view of the dynamometer with a portion of the stator removed from the assembly.

The stator generally indicated by numeral 42 includes a plurality of spaced annular plates 44 which are diametrically split into two halves 44a and 44b as best seen in FIGURE 3. These halves are removably received in annular grooves 46 of the housing 10. Each plate is provided with a plurality of axial apertures 48 which are fitted with short tubes 50. Stator plates 44 are designed to be assembled between the spaced disks 20 of the rotor as best shown in FIGURE 4 and upon removal of the housing 10 the stator plate halves 44a and 44b remain within the housing halves 14 and 12 respectively, as best illustrated in FIGURE 3. Two keys 52 which are held in keyways 54 by screws 56 serve to contain the half plates 44b within the housing section 12 by virtue of the key 52 passing across notched ends 58 upon opposite ends of the half plates 44b.

Figure 2:
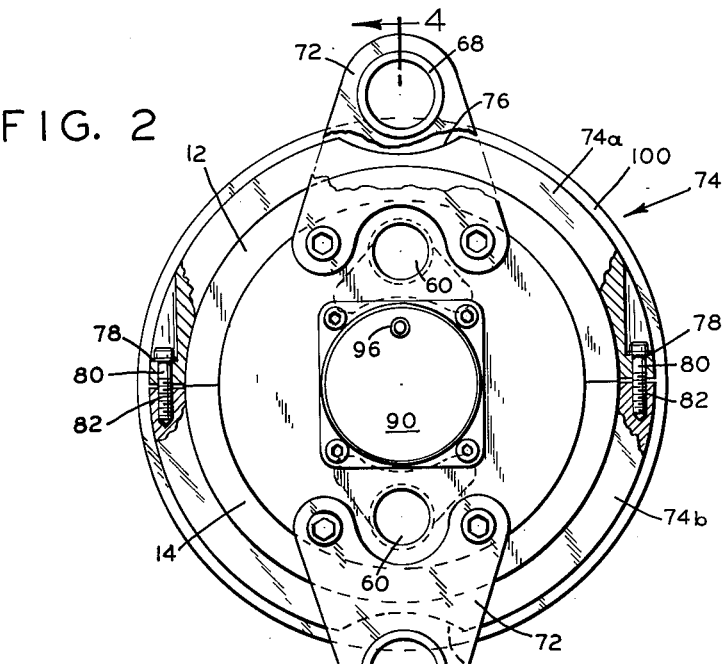
FIGURE 2 is an end view of the dynamometer along lines 2—2 in FIGURE 1.

End cap 28 is provided with two diametrically opposite water inlet passageways 60 which terminate in an annular space to direct fluid in a substantially circumferential stream into the rotor 16. At the end opposite the inlet passageways 60 are a plurality of radial discharge ports 62 which exhaust fluid into manifold 64 on the housing section 12 and into manifold 66 on the housing section 14. Two discharge pipes 68 and 70 connect with the manifolds 64 and 66 respectively, and are supported at their free ends by brackets 72. A plurality of band clamps 74 are constructed of two substantially semicircular halves 74a and 74b each having a cut out section 76 and 77 respectively to allow clearance for the discharge pipes 68 and 70. Half clamp 74a is provided with two seats 78 against which capscrews 80 press when the screws are screwed into the threaded ends 82 of the half clamp 74b for securing the housing halves 12 and 14 to one another. FIGURES 1 and 2 best illustrate the band clamp arrangement. It will be obvious to those skilled in the art that suitable gaskets and O-rings are used wherever necessary to form a fluid-tight structure, such as gaskets 84, 86 and 88 indicated in FIGURES 4 and 5. A cover plate 90 covers one shaft end and a second cover plate 92 covers the bearing 22 but allows the shaft 18 to project.

In operation the dynamometer is usually driven by a quill shaft (not shown) each end of which is provided with splines. One end is to mate in a splined end 94 of shaft 18 and the other end to mate in a splined end of the apparatus being tested (not shown). The inlet passageways 60 are connected to a source of water supply through suitable control devices and water is circulated through the dynamometer as the rotor is driven from the apparatus being tested. Water flows then from one end of the unit to the other, being forced alternately through the holes in the plates and disks. As the water impinges on the sides of the plates and disks and is forced through the apertures, rotation of the rotor is impeded due to the energy dissipated by the water. The discharge flow through the pipes 68 and 70 is tested and checked by suitable instruments (not shown) which are attached thereto. From the results of these tests, which may encompass rate of flow, temperature, and pressure, the power output of the apparatus under test can be established.

A variety of testing procedures can be used such as completely filling the dynamometer with water and adjusting the inlet and outlet ports so that the unit remains full during the test, notwithstanding the fact that the water continues to flow. An additional method can be used wherein the dynamometer is filled only partially and the inlet and outlet ports adjusted to maintain this status throughout the test. Furthermore, adjustment of the internal resistance of the dynamometer can be easily and readily effected by removal or replacement of one or more of the stator plates 44. In this manner, one dynamometer unit can be modified in the field to serve for an extended range of load conditions, thereby obviating the need for units of varying size. Also any repair or overhaul of the unit which involves the replacement of stator plates is performed in a minimum of time.

It will be apparent that the water seal 36 adjacent to the inlets 60 will be cooled by the inflowing water, however, if the dynamometer is only partially full of water, seal 34 will become dry and hot. To overcome this condition, a separate supply of cool water is directed to the seal 34 through a duct 94 from a source not shown. If it is desirable to check the running temperature of bearings 22 and 27, thermocouples 96 can be inserted as shown in the cover plates 90 and 92. A central hole 98 in the rotor 16 can be used to accommodate wires leading to a thermocouple in the device under test to measure its temperature.

A flange 100 on the end cap 24 serves to support a torque arm in the event that it is desirable to use a device such as a prony brake.

One of the important features of the present design concerns the deliberate misalignment of the apertures in the stator plates with respect to opposite and corresponding apertures in the rotor disks. Although normally the plates and disks are provided with an equal quantity of apertures, a longitudinal axis through corresponding apertures in adjacent disks, a row of apertures, is inclined with respect to the axis of rotation of said rotor and with respect to a corresponding axis through a similar set of apertures in the plates, the latter axis being parallel to the axis of rotation. Line X in FIGURE 3 is a typical axis through a row of disk apertures, which axis is inclined with respect to axis Y extending through a typical row of plate apertures. This intentional misalignment of opposite apertures forces individual changes of direction of the fluid as water passes consecutively from apertures in the plates through apertures in the disks. Therefore, this arrangement substantially eliminates the undesirable vibratory conditions and high frequency beats generated at the instant when all apertures become cyclically aligned and misaligned.

By virtue of the integral shaft and rotor design, the critical rotor speed is raised, thus enabling the dynamometer to operate at a higher speed than would be possible with an equivalent ten piece rotor.

Last but not least, load stability of the foregoing design is enhanced by the provision of an annular space at the water inlet, which space causes the fluid to be injected into the dynamometer as a circumferential stream rather than allowing two articulate jets to impinge upon the rotor, this latter condition being prevalent on many commercial units available heretofore. Conversely, the radial discharge ports and provision of two discharge pipes located at 180 degrees with respect to one another have the same stabilizing effect at the water outlet side.

All of these features contribute to a new and greatly improved dynamometer unit which provides extremely smooth control over an extended and adjustable power range.

While there has been described and illustrated a certain specific embodiment of the invention, it will be apparent to those skilled in the art that various modifications and changes may be made therein without deviating from the intent and principle of the present invention which shall be limited only by the scope of the appended claims.

What is claimed is:
1. In a dynamometer, the combination of: a stator comprising a plurality of axially spaced annular plates; a rotor provided with a plurality of axially spaced disks whereby said disks have surfaces opposed to and spaced from the surfaces of said plates; each of said plates and disks provided with radially spaced axial apertures through which fluid introduced into the dynamometer is adapted to flow; respective apertures in the plates being arranged in rows and axes through said rows being disposed substantially parallel to the axis of rotation of said rotor; respective apertures in the disks being also arranged in rows and the axes through respective apertures of the disks being inclined with respect to the corresponding axes associated with the plates thereby causing the majority of opposing apertures in adjacent plates and disks to be misaligned to provide substantially constant power dissipation for any rotational position of the rotor as fluid passes through the apertures from the plates to the disks.

2. In a dynamometer the combination of: a stator provided with a plurality of axially spaced annular plates; a rotor disposed in the stator and said rotor provided with a plurality of axially spaced disks whereby said disks have surfaces opposed to and spaced from the surfaces of said plates; each of said plates and disks being provided with radially spaced axial apertures through which fluid introduced into the dynamometer is adapted to flow; respective axial apertures in the plates and respective axial apertures in the disks being arranged in longitudinal rows, and said plate and disk apertures being disposed relative to one another in such relation that the majority of plate and disk apertures are out of registration with one another for any rotational position of the stator whereby to provide a dynamometer which exhibits substantially constant power dissipation as the rotor rotates in the stator and fluid passes through the apertures from the plates to the disks.

3. In a dynamometer as set forth in claim 2 wherein said plates are fastened removably in the stator.

4. In a dynamometer as set forth in claim 2 wherein each plate comprises a set of semi-annular portions.

5. In a dynamometer as set forth in claim 2 which includes fluid inlet and outlet means for introducing fluid into the space between said plates and disks, and said inlet and outlet means are disposed at opposite ends of the stator.

6. In a dynamometer as set forth in claim 2 wherein means are provided for introducing liquid into the space between the stator and the rotor in a substantially circumferential stream.

7. In a dynamometer as set forth in claim 2 wherein said stator is provided with circular grooves, each adapted for supporting and retaining therein one of the annular plates.

References Cited in the file of this patent
UNITED STATES PATENTS

| | | |
|---|---|---|
| 1,718,175 | Nilson | June 18, 1929 |
| 1,854,952 | Nilson | Apr. 19, 1932 |
| 2,514,137 | O'Connor | July 4, 1950 |
| 2,727,594 | Ganster | Dec. 20, 1955 |

FOREIGN PATENTS

| | | |
|---|---|---|
| 53,057 | France | Sept. 18, 1944 |